US 12,263,950 B2

(12) United States Patent
Hennig et al.

(10) Patent No.: US 12,263,950 B2
(45) Date of Patent: Apr. 1, 2025

(54) AIRCRAFT REFRIGERATION SYSTEM HAVING A MOTOR-ASSISTED CABIN EXHAUST AIR TURBINE

(71) Applicant: Airbus Operations GmbH, Hamburg (DE)

(72) Inventors: Oliver Hennig, Hamburg (DE); Frank Klimpel, Hamburg (DE); Henning Everth, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 613 days.

(21) Appl. No.: 16/661,447

(22) Filed: Oct. 23, 2019

(65) Prior Publication Data
US 2020/0130849 A1 Apr. 30, 2020

(30) Foreign Application Priority Data
Oct. 29, 2018 (DE) .......................... 102018126921.8

(51) Int. Cl.
*B64D 13/08* (2006.01)
*B64D 13/00* (2006.01)
(Continued)

(52) U.S. Cl.
CPC ........... *B64D 13/08* (2013.01); *B64D 13/006* (2013.01); *B64D 33/02* (2013.01); *B64D 33/04* (2013.01);
(Continued)

(58) Field of Classification Search
CPC ........ B64D 13/08; B64D 13/06; B64D 13/02; B64D 13/006; B64D 2013/0618;
(Continued)

(56) References Cited

U.S. PATENT DOCUMENTS 2,391,838 A * 12/1945 Kleinhans et al. .... B64D 13/08
454/71
3,311,161 A * 3/1967 Glaspie ................. B64D 13/06
62/402
(Continued)

FOREIGN PATENT DOCUMENTS

DE 102015222193 A1 5/2017
EP 2735510 A1 5/2014
(Continued)

OTHER PUBLICATIONS

European Search Report for corresponding European Patent Application No. 19204472 dated Mar. 4, 2020.

*Primary Examiner* — Gordon A Jones
(74) *Attorney, Agent, or Firm* — Greer, Burns & Crain, Ltd.

(57) ABSTRACT

An aircraft refrigeration system comprises an ambient air line, through which ambient air flows and which is connected to conduct ambient air to an aircraft, an ambient air compressor, arranged in the ambient air line, for compressing the ambient air in the ambient air line, a cabin exhaust air turbine, connected to a cabin exhaust air line and coupled to the ambient air compressor in the ambient air line and configured to expand cabin exhaust air flowing through the cabin exhaust air line and to drive the ambient air compressor, a transmission, configured to couple the cabin exhaust air turbine to the ambient air compressor and to set a speed of the ambient air compressor, and a motor, coupled to the transmission and configured to drive the ambient air compressor.

8 Claims, 3 Drawing Sheets

(51) Int. Cl.
*B64D 33/02* (2006.01)
*B64D 33/04* (2006.01)
*B64D 13/06* (2006.01)

(52) U.S. Cl.
CPC ............ *B64D 2013/0611* (2013.01); *B64D 2013/0618* (2013.01); *B64D 2013/0688* (2013.01)

(58) Field of Classification Search
CPC .... B64D 2013/0688; B64D 2013/0611; B64D 2013/064; B64D 2013/0644; B64D 2013/0655; B64D 2221/00; B64D 33/02; B64D 33/04; F02C 6/08
See application file for complete search history.

(56) References Cited

U.S. PATENT DOCUMENTS

| | | | | |
|---|---|---|---|---|
| 3,470,703 | A * | 10/1969 | Wen | B64D 13/006 62/61 |
| 4,312,191 | A * | 1/1982 | Biagini | B64D 13/06 62/402 |
| 5,722,229 | A * | 3/1998 | Provost | F02C 3/113 60/785 |
| 6,012,515 | A * | 1/2000 | Stubbendorff | B64D 13/08 236/1 C |
| 6,058,715 | A | 5/2000 | Strang et al. | |
| 6,491,254 | B1 * | 12/2002 | Walkinshaw | B64D 13/00 244/119 |
| 6,948,325 | B1 * | 9/2005 | Axe | B64D 13/06 62/402 |
| 10,457,399 | B2 * | 10/2019 | Bammann | B64D 13/06 |
| 10,745,138 | B2 * | 8/2020 | Connell | B64C 1/067 |
| 10,870,490 | B2 * | 12/2020 | Bruno | B64D 13/02 |
| 10,940,951 | B2 * | 3/2021 | Bruno | B64D 13/06 |
| 11,260,979 | B2 * | 3/2022 | Zhu | B64D 13/06 |
| 11,300,139 | B2 * | 4/2022 | Beers | B64D 13/08 |
| 11,466,904 | B2 * | 10/2022 | Bruno | B64D 13/08 |
| 2005/0051668 | A1 * | 3/2005 | Atkey | B64D 13/06 244/118.5 |
| 2010/0193631 | A1 * | 8/2010 | Laude | F01D 21/00 244/58 |
| 2014/0144163 | A1 | 5/2014 | Klimpel et al. | |
| 2017/0036768 | A1 * | 2/2017 | Stieger | F02C 9/54 |
| 2017/0081031 | A1 * | 3/2017 | Bammann | B64D 13/06 |
| 2017/0129614 | A1 | 5/2017 | Bammann et al. | |
| 2018/0266329 | A1 * | 9/2018 | Mackin | F02C 7/36 |
| 2019/0077514 | A1 | 3/2019 | Silet et al. | |
| 2019/0135440 | A1 * | 5/2019 | Bruno | B64D 13/06 |
| 2019/0291873 | A1 | 9/2019 | Connell et al. | |
| 2020/0377217 | A1 * | 12/2020 | Zhu | F02C 6/08 |
| 2022/0033093 | A1 * | 2/2022 | Bruno | B64D 13/08 |

FOREIGN PATENT DOCUMENTS

| | | |
|---|---|---|
| EP | 3543130 A1 | 9/2019 |
| WO | 2017168074 A1 | 10/2017 |

* cited by examiner

AIRCRAFT REFRIGERATION SYSTEM HAVING A MOTOR-ASSISTED CABIN EXHAUST AIR TURBINE

CROSS-REFERENCES TO RELATED APPLICATIONS

This application claims the benefit of the German patent application No. 102018126921.8 filed on Oct. 29, 2018, the entire disclosures of which are incorporated herein by way of reference.

FIELD OF THE INVENTION

The invention relates to an aircraft refrigeration system and to a method for operating an aircraft refrigeration system.

BACKGROUND OF THE INVENTION

An aircraft air conditioning system is used to set and maintain a desired pressure, a desired temperature and a desired air humidity in an aircraft cabin. Moreover, the aircraft air conditioning system feeds sufficient fresh air into the aircraft cabin to ensure that a prescribed minimum proportion of fresh air is present in the aircraft cabin. EP 2 735 510 A1 and US 2014/0144163 A1 disclose an aircraft air conditioning system in which a refrigeration unit operated with a two-phase refrigerant is used to cool ambient air compressed by a multistage compressor. The refrigeration unit comprises a refrigerant circuit, in which a compressor, a condenser, an expansion valve and an evaporator through which ambient air to be cooled flows are arranged. Bleed air taken from an engine or an auxiliary engine of the aircraft is used to drive the compressor of the refrigeration unit and to drive the multistage compressor for compressing the ambient air.

DE 10 2015 222 193 A1 discloses an aircraft air conditioning system in which a cabin exhaust air turbine expands cabin exhaust air and drives an ambient air compressor arranged on a common shaft. The pressure of the exhaust air discharged from an aircraft cabin, which exceeds the ambient pressure outside the aircraft above a certain altitude, is thereby used for energy recovery.

SUMMARY OF THE INVENTION

It is an underlying object of the invention to enable more efficient use of an aircraft air conditioning system. It is furthermore an underlying object of the invention to provide a method for operating an aircraft refrigeration system.

An aircraft refrigeration system comprises an ambient air line, through which ambient air can flow and which is connected to an aircraft cabin in order to conduct ambient air to the aircraft cabin. For example, the ambient air line can be connected additionally or exclusively to a mixer of an aircraft air conditioning system in order to feed the mixer with ambient air taken from the aircraft environment. The mixer connected to the ambient air line can be a pre-mixer or a main mixer of the aircraft air conditioning system, to which not only the ambient air from the ambient air line but also recirculated air discharged from an aircraft cabin to be air conditioned by means of the aircraft air conditioning system is fed. In the mixer, the ambient air from the ambient air line is mixed with the recirculated air discharged from the aircraft cabin. Finally, the mixed air produced in the mixer is used to air condition the aircraft cabin.

Furthermore, the aircraft refrigeration system comprises at least one ambient air compressor, arranged in the ambient air line, for compressing the ambient air flowing through the ambient air line. Especially above a certain altitude, it is necessary to compress the ambient air to ensure the desired pressure of the air for the aircraft cabin to be air conditioned.

Furthermore, the aircraft refrigeration system comprises a cabin exhaust air turbine, which is connected to a cabin exhaust air line and coupled to the at least one ambient air compressor arranged in the ambient air line. The cabin exhaust air turbine is configured to expand cabin exhaust air flowing through the cabin exhaust air line and to drive the at least one ambient air compressor arranged in the ambient air line. In the aircraft refrigeration system, the pressure of the exhaust air discharged from an aircraft cabin, which, while an aircraft equipped with the aircraft refrigeration system is in flight, exceeds the ambient pressure outside the aircraft above a certain altitude, is thus used for energy recovery. The energy recovered from the cabin exhaust air is used to drive the at least one ambient air compressor. The additional supply of ambient air enables the energy consumption of the aircraft air conditioning system to be reduced since less bleed air is required in the air conditioning of the aircraft cabin by the aircraft air conditioning system.

Furthermore, the aircraft refrigeration system comprises a transmission, which is configured to couple the cabin exhaust air turbine to the ambient air compressor and to set a speed of the ambient air compressor. This makes it possible to operate both the ambient air compressor and the cabin exhaust air turbine in optimum speed ranges. It is thereby possible to conduct the ambient air to the aircraft cabin more efficiently than would be the case, for example, with a common solid shaft between the cabin exhaust air turbine and the ambient air compressor.

Moreover, the aircraft refrigeration system comprises a motor, which is coupled to the transmission and is configured to drive the at least one ambient air compressor arranged in the ambient air line. While the cabin exhaust air turbine is capable of enabling energy recovery and thus a reduction of the energy consumption of the aircraft air conditioning system, the use of a transmission and a motor coupled to the transmission allows the use of the ambient air compressor over a greater period of time and a wider range of uses. In particular, the ambient air compressor is equipped with a further power source, and it is therefore also possible to operate the ambient air compressor independently of the power made available by the cabin exhaust air turbine.

Controlling the transmission and/or the motor in accordance with the operation of the cabin exhaust air turbine, for example, enables the ambient air compressor to feed the aircraft cabin or the mixer with ambient air flowing through the ambient air line after compression to a setpoint cabin pressure and/or to feed the aircraft cabin or the mixer with a constant volume flow of compressed ambient air. In this way, it is possible to set a predetermined transmission ratio at the transmission and/or to operate the motor at a predetermined speed, thus ensuring that the ambient air compressor is operated in a constant way, even in cases in which the power of the cabin exhaust air turbine fluctuates. By means of the constant volume flow of compressed ambient air which is achieved in this way, additional components of the aircraft air conditioning system which feed fresh air to the aircraft cabin or the mixer or additional ambient air compressors provided in the ambient air line can likewise be operated in a constant way, thereby making the entire aircraft air conditioning process more efficient. Moreover, it is possible overall for a larger volume flow of compressed ambient air to be provided, as a result of which the other components of the aircraft air conditioning system require less bleed air.

The aircraft refrigeration system can be an independent unit which is installed in an aircraft in addition to an existing aircraft air conditioning system. Thus, the aircraft refrigeration system can support an existing aircraft air conditioning system (in an already existing aircraft), thereby enabling the system to be operated more efficiently. Of course, the aircraft refrigeration system can also be integrated into the aircraft air conditioning system during the original construction of an aircraft.

The motor can be a hydraulic motor or, alternatively, an electric motor. While a hydraulic motor requires no cooling or less cooling than an electric motor, lines for supplying the hydraulic motor with hydraulic fluid are heavier. Therefore, a hydraulic motor is very suitable where short hydraulic lines are required, while an electric motor is very suitable where there is already sufficient cooling of the electric motor.

For example, the hydraulic motor can be connected to a hydraulic system which is normally provided for the actuation of an undercarriage of an aircraft equipped with the aircraft refrigeration system. Aircraft air conditioning systems are often installed in the belly of an aircraft, in which (or at least close to which) part of the undercarriage of the aircraft is normally also installed. As a result, the high capacity of the hydraulic system for retracting and extending the undercarriage can be used before and after the actuation thereof for a hydraulic motor in the aircraft refrigeration system without the need to install additional capacity in the hydraulic system.

The aircraft refrigeration system can furthermore comprise a fan, which is configured to move air in a ram air duct. A fan of this kind is used predominantly during ground operation of the aircraft in order to supply components arranged in the ram air duct with sufficient ambient air. The aircraft refrigeration system furthermore comprises an auxiliary train, which is coupled to the motor and to the fan and is configured to drive the fan. The auxiliary train can be embodied by an opposite side of the shaft of the motor, which is coupled to the ambient air compressor via the transmission. As an alternative, the auxiliary train can also be an independent shaft of the motor, which is driven in addition to the main shaft of the motor.

As an alternative or in addition, the aircraft refrigeration system can furthermore comprise an auxiliary transmission, which is configured to couple the motor to the fan and to set a speed of the fan. The auxiliary transmission can be an independent transmission which is coupled to a main shaft of the motor or to the auxiliary train. Alternatively, it is also possible for the auxiliary transmission to be part of the transmission which couples the motor to the ambient air compressor. In other words, the auxiliary transmission offers not only a drive shaft for the ambient air compressor, but also another drive shaft for the fan.

As a result, the motor can not only form a second source of power for the ambient air compressor, but can also operate the fan. This makes it possible to dispense with a dedicated drive for the fan, thereby making it possible to save weight.

The aircraft refrigeration system can comprise a thermal coupling device. The thermal coupling device, in turn, can be configured to be connected as a heat sink to a refrigeration unit in order to transfer heat from the ambient air flowing through the ambient air line to the refrigeration unit before the ambient air is fed into the aircraft cabin. For example, a refrigeration unit of an aircraft air conditioning system comprises a refrigerant circuit, through which a refrigerant can flow, and can comprise a refrigerant compressor arranged in the refrigerant circuit. This can be an expansion-type refrigeration unit or a vapor compression refrigeration unit. In this case, for example, the thermal coupling device is implemented in the form of a heat exchanger designed as a evaporator and is thermally coupled to the ambient air line in order to transfer heat from the ambient air flowing through the ambient air line to the refrigerant circulating in the refrigerant circuit before the ambient air is fed into the aircraft cabin or into the mixer of the aircraft air conditioning system. Thus, in the aircraft air conditioning system, a further air conditioning process takes place in which the ambient air is first of all compressed by the ambient air compressor, and then cooled to a desired temperature through the transfer of heat to the refrigerant circulating in the refrigerant circuit of the refrigeration unit. The efficiency of this air conditioning process can be controlled according to requirements by appropriate pre-compression of the ambient air in the ambient air compressor.

Moreover, the aircraft refrigeration system can comprise a control device which is configured to control the transmission and/or the motor in accordance with the operation of the cabin exhaust air turbine. Thus, the control device can set a transmission ratio of the transmission and/or a speed of the motor in such a way that the ambient air compressor is operated in a constant manner For example, the transmission and/or the motor can be controlled in such a way, in accordance with the operation of the cabin exhaust air turbine, that the ambient air compressor feeds the aircraft cabin or the mixer with a constant volume flow of compressed ambient air. Furthermore, the control device can detect a power, a speed and/or a torque of the cabin exhaust air turbine and control the transmission and/or the motor in accordance with the variable detected. Thus, fluctuations in the cabin exhaust air turbine can be compensated by means of the transmission and/or the motor. Of course, the motor can also be controlled in such a way by the control device that the ambient air compressor is driven exclusively by the motor.

Finally, the control device is also configured to detect a failure of the refrigeration unit. In such a case, the control device can control the transmission and/or the motor in such a way in accordance with the failure of the refrigeration unit that the ambient air compressor feeds the aircraft cabin or the mixer with a minimum volume flow of compressed ambient air required for emergencies. This ensures a sufficient supply of fresh air to the aircraft cabin. As an alternative or in addition, the control device can also be configured to control the transmission and/or the motor in such a way that the ambient air compressor maintains a minimum cabin pressure required for emergencies.

Since the failure of the refrigeration unit is problematic, especially at relatively high altitudes, owing to the associated pressure drop in the aircraft cabin, the aircraft refrigeration system offers a good supply of fresh air to the aircraft cabin in this eventuality. Particularly if the aircraft refrigeration system is provided as a separate unit, it is possible in this way to create a redundant fresh air supply to the aircraft cabin. Moreover, the pressure drop in the aircraft cabin can be slowed down by reducing a volume flow of the cabin exhaust air as quickly as possible, with the motor taking over the operation of the ambient air compressor instead. This extends the time over which the aircraft cabin pressure falls or prevents the aircraft cabin pressure falling completely to the ambient level. This extended time enhances the safety of the passengers, possibly giving the aircraft sufficient time to descend to a safer cruising altitude. It is furthermore possible to dispense with an emergency ram air flap provided for the above-described emergency of a pressure drop in the aircraft cabin. This emergency ram air flap is normally opened only in an emergency in order to deliver fresh air into the aircraft cabin by means of the ram pressure of the ram air. If the transmission and/or the motor are set in such a way that the ambient air compressor makes available sufficient ambient air (fresh air) to the aircraft cabin, it is possible to dispense with an emergency ram air flap, thereby reducing the number of openings and flaps on the outer skin of the aircraft and thus improving the aerodynamics of the aircraft.

Here, the terms "downstream" and "upstream" relate to the flow direction of a fluid through the respectively described line, e.g., ram air in a ram air duct or ambient air in an ambient air line or exhaust air in an exhaust air line.

The aircraft refrigeration system can furthermore comprise a cabin exhaust air valve which is arranged downstream of the cabin exhaust air turbine and is configured to direct the cabin exhaust air flowing through the cabin exhaust air line, either via a first segment of the cabin exhaust air line into a ram air duct upstream of at least one heat exchanger arranged in the ram air duct, or via a second segment of the cabin exhaust air line to an outlet which discharges the cabin exhaust air in a direction counter to a direction of flight of an aircraft equipped with the aircraft refrigeration system into an environment of the aircraft. On the one hand, this enables the expanded cabin exhaust air to be used to cool the at least one heat exchanger arranged in the ram air duct. The ram air requirement of the aircraft air conditioning system associated with the at least one heat exchanger, and consequently the aerodynamic resistance caused by the supply of ram air into the aircraft air conditioning system, can thereby be reduced. On the other hand, guiding the cabin exhaust air via the second segment to the outlet makes it possible to use the expanded cabin exhaust air to reduce turbulences at the outlet of a ram air duct or some other exhaust air outlet at an outer skin of the aircraft. In other words, the thrust is improved since the outlet of the cabin exhaust air counter to the direction of flight provides the aircraft with additional momentum. All this allows a reduction in the fuel consumption of the aircraft. It is of course also possible to set the cabin exhaust air valve in such a way that the cabin exhaust air is directed partially into the first segment of the cabin exhaust air line and likewise partially into the second segment of the cabin exhaust air line.

For this purpose, the cabin exhaust air valve can optionally be equipped with a temperature sensor or connected to a temperature sensor or controlled with the aid of a temperature sensor (e.g., by the control device). The temperature sensor is configured to measure a temperature of cabin exhaust air flowing through the cabin exhaust air line downstream of the cabin exhaust air turbine. In one example, the temperature sensor is configured to control the cabin exhaust air valve on the basis of the measured temperature of the cabin exhaust air. As an alternative, control is performed by other components (e.g., actuators for the valve) in accordance with the measured temperature. In a very simple embodiment, the cabin exhaust air valve is equipped with a shape-changing actuator which changes shape in accordance with a temperature (in this case the cabin exhaust air temperature). A bimetal can be used, for example.

An auxiliary heater thermally coupled to the cabin exhaust air line upstream of the cabin exhaust air turbine can optionally be arranged downstream of the ambient air compressor, in one segment of the ambient air line. The auxiliary heater is preferably configured to transfer heat from the ambient air flowing through the ambient air line downstream of the ambient air compressor to the cabin exhaust air flowing through the cabin exhaust air line upstream of the cabin exhaust air turbine. By means of the auxiliary heater, the temperature of the cabin exhaust air entering the cabin exhaust air turbine can be increased and, consequently, the power of the cabin exhaust air turbine can be boosted.

In a method for operating an aircraft refrigeration system, ambient air is directed through an ambient air line, which is connected to an aircraft cabin and/or a mixer of an aircraft air conditioning system in order to feed ambient air to the aircraft cabin or the mixer. The ambient air flowing through the ambient air line is compressed in at least one ambient air compressor arranged in the ambient air line. Furthermore, cabin exhaust air flowing through a cabin exhaust air line is expanded in a cabin exhaust air turbine connected to the cabin exhaust air line, wherein the cabin exhaust air turbine is coupled to the at least one ambient air compressor arranged in the ambient air line and drives the at least one ambient air compressor arranged in the ambient air line.

Furthermore, the method can comprise setting a speed of the ambient air compressor by means of a transmission, wherein the transmission is configured to couple the cabin exhaust air turbine to the ambient air compressor, and finally driving the at least one ambient air compressor arranged in the ambient air line by means of a motor coupled to the transmission.

In one variant embodiment, in which the motor is a hydraulic motor, hydraulic fluid is fed to the hydraulic motor from a hydraulic system for the actuation of an undercarriage of an aircraft.

Furthermore, air can be moved in a ram air duct by means of a fan, wherein the motor is coupled to the fan by means of an auxiliary train, which is configured to drive the fan. As an alternative or in addition, the motor is coupled to the fan by means of an auxiliary transmission, which is configured to set a speed of the fan.

The method can furthermore comprise various control steps carried out by a control device. For example, the transmission and/or the motor are/is controlled in accordance with the operation of the cabin exhaust air turbine. As an alternative or in addition, the transmission and/or the motor can be controlled in such a way in accordance with the operation of the cabin exhaust air turbine that the ambient air compressor feeds the aircraft cabin or the mixer with a constant volume flow of compressed ambient air.

Likewise, as an alternative or in addition, the transmission and/or the motor can be controlled in such a way in accordance with the failure of a refrigeration unit that the ambient air compressor feeds the aircraft cabin or the mixer with a minimum volume flow of compressed ambient air required for emergencies. As an alternative or in addition, the transmission and/or the motor can be controlled in such a way that the ambient air compressor maintains a minimum cabin pressure required for emergencies. In this case, a refrigeration unit which comprises a refrigerant circuit through which a refrigerant can flow is optionally provided. The refrigeration unit is thermally coupled as a heat sink to the ambient air line in order to transfer heat from the ambient air flowing through the ambient air line to the refrigeration unit before the ambient air is fed into the aircraft cabin or the mixer. The ambient air line can be thermally coupled to the refrigerant circulating in the refrigerant circuit, for example.

BRIEF DESCRIPTION OF THE DRAWINGS

A preferred embodiment of the invention is now explained in greater detail with reference to the appended schematic drawings, in which.

DETAILED DESCRIPTION OF THE PREFERRED EMBODIMENTS

Figure 1:
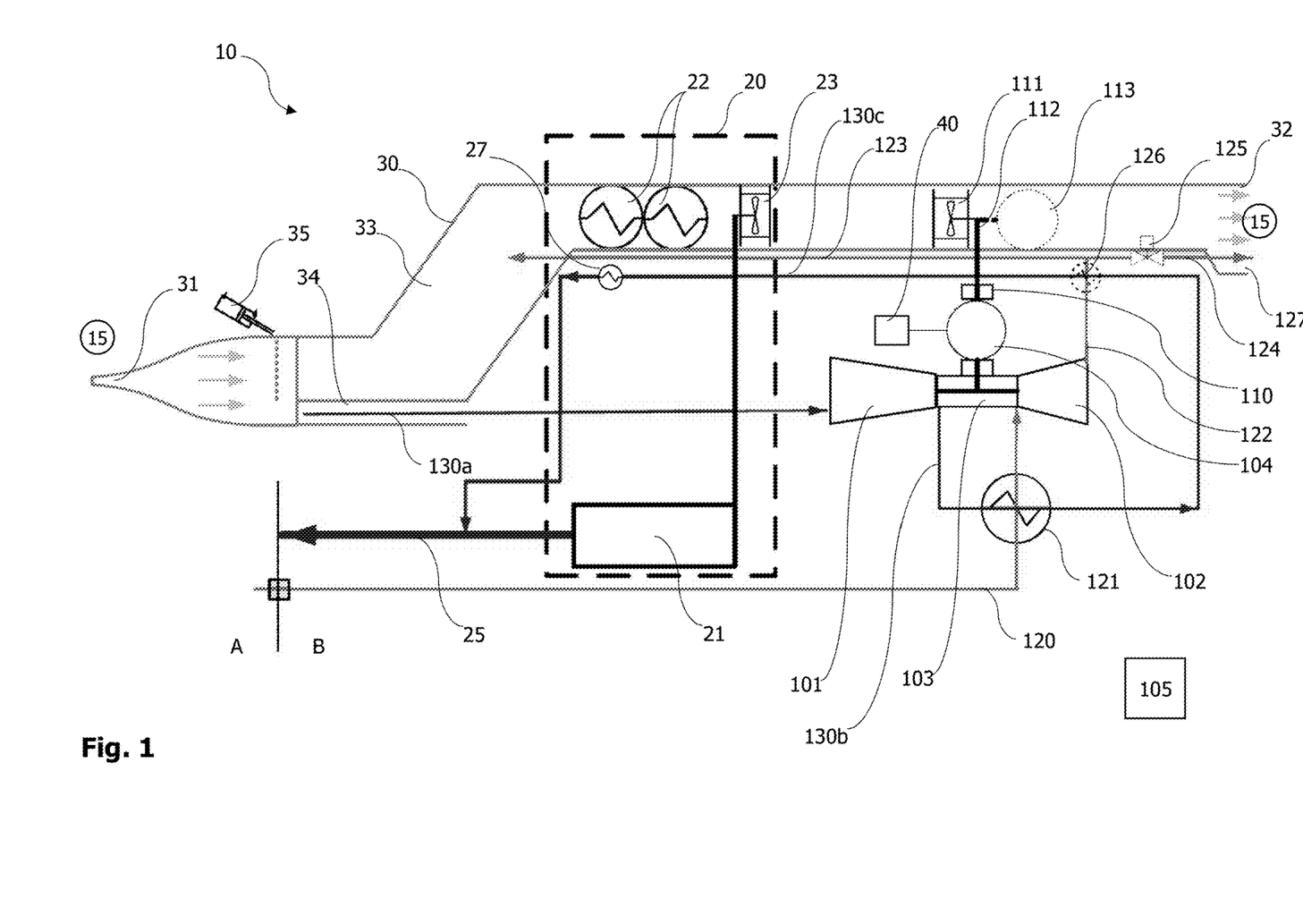
FIG. 1 shows an aircraft refrigeration system for air conditioning an aircraft cabin.

An aircraft refrigeration system 10 illustrated in FIG. 1 comprises an ambient air line 130, through which ambient air can flow, and which is connected to an aircraft cabin A, in order to feed the ambient air taken from an aircraft environment 15 to the aircraft cabin A. In this arrangement, the ambient air line 130 can be connected to a mixer 25 of an already existing or additionally installed aircraft air conditioning system, for example, in order to feed the mixer 25 with the ambient air taken from the aircraft environment 15. In the mixer 25, the ambient air from the ambient air line 130 is mixed with recirculated air discharged from an aircraft cabin. Finally, the mixed air produced in the mixer 25 is used to air condition the aircraft cabin.

In FIG. 1, the aircraft cabin is indicated in the abstract by the region "A," which is a region of the aircraft 1 (FIG. 3) which can be subjected by means of the aircraft refrigeration system 10 and/or the aircraft air conditioning system to a pressure which is higher than a pressure in the aircraft environment 15. The region indicated by "B" is an unpressurized region of the aircraft. The pressure prevailing here corresponds to the pressure in the aircraft environment 15 or at least to a pressure which is lower than in the aircraft cabin.

The aircraft air conditioning system is equipped with a refrigeration unit 20, which has a refrigerant circuit. The refrigerant used in the refrigerant circuit can be a two-phase refrigerant, e.g., R134A (CH2F-CF3), CO2 or R-245fa (1,1,1,3,3-pentafluoropropane). The refrigeration unit can furthermore comprise a refrigerant compressor 21 arranged in the refrigerant circuit.

The ambient air line 130 is thermally coupled to the refrigeration unit 20 as a heat sink, particularly in a segment 130c of the ambient air line 130, in order to transfer heat from the ambient air flowing through the ambient air line 130 before the ambient air is fed into the aircraft cabin A and/or the mixer 25. In addition to the refrigerant compressor 21, a condenser, a refrigerant accumulator, an expansion valve (none of these being illustrated) and an evaporator 27, which couples the refrigeration unit 20 thermally to the ambient air line 130, can be arranged in the refrigerant circuit.

The ambient air line 130 comprises a first segment 130a, in which an ambient air compressor 101 for compressing the ambient air flowing through the first segment 130a of the ambient air line 130 is arranged. The ambient air compressor 101 is coupled to a cabin exhaust air turbine 102, which is connected to a cabin exhaust air line 120. During operation, the cabin exhaust air turbine 102 expands cabin exhaust air flowing through the cabin exhaust air line 120 and drives the ambient air compressor 101. The pressure of the exhaust air discharged from an aircraft cabin A, which, while an aircraft 1 equipped with the aircraft refrigeration system 10 is in flight, exceeds the ambient pressure outside the aircraft 1 above a certain altitude, can thereby be used for energy recovery. The energy recovered from the cabin exhaust air is used to drive the ambient air compressor 101.

The coupling of the ambient air compressor 101 to the cabin exhaust air turbine 102 is accomplished by means of a transmission 103, which is configured to set a speed of the ambient air compressor 101. Moreover, a motor 104 coupled to the transmission 103 can (additionally or exclusively) drive the ambient air compressor 101 arranged in the ambient air line 130. This allows continuous operation of the ambient air compressor 101 and/or operation of the ambient air compressor 101 in its optimum speed range, irrespective of the pressure difference between the discharged cabin exhaust air and the ambient pressure. For this purpose, the transmission 103 is equipped with two drive trains, to which the motor 104 and the cabin exhaust air turbine 102 are connected, and one output train to which the ambient air compressor 101 is connected.

The ambient air compressor 101 is controlled in such a way by a control device 105 of the aircraft refrigeration system 10 that it compresses the ambient air flowing through the first segment 130a of the ambient air line 130 to the setpoint cabin pressure in the aircraft cabin A to be air conditioned. As an alternative or in addition, the ambient air compressor 101 can also supply a constant volume flow of compressed ambient air. In particular, the control device 105 can control the transmission 103 and/or the motor 104 in accordance with the operation of the cabin exhaust air turbine 102. A transmission ratio of the transmission 103 or a speed of the motor 104 can be set by the control device 105 in such a way that continuous operation of the ambient air compressor 101 is ensured, for example. Another case of control is the failure of the refrigeration unit 20, wherein the control device 105 controls the ambient air compressor 101 in such a way that it feeds the aircraft cabin A and/or the mixer 25 with a minimum volume flow of compressed ambient air required for emergencies and/or that the ambient air compressor 101 feeds the aircraft cabin A and/or the mixer 25 with ambient air at the pressure required for emergencies.

The control device 105 of the aircraft refrigeration system 10 can furthermore control the operation of the cabin exhaust air turbine 102 in accordance with a difference between a pressure of the cabin exhaust air and a pressure of the ambient air fed to the aircraft refrigeration system 10 from the aircraft environment via the ambient air line 130. For example, the control device 105 can control the operation of the cabin exhaust air turbine 102 in such a way that the cabin exhaust air turbine 102 is operated only when the pressure of the cabin exhaust air is higher than the pressure of the ambient air fed to the aircraft refrigeration system 10 from the aircraft environment via the ambient air line 130. Particularly simple control of the operation of the cabin exhaust air turbine 102 is possible if the control device 105 controls the operation of the cabin exhaust air turbine 102 in accordance with the altitude of an aircraft 1 equipped with the aircraft refrigeration system 10 and, for example, puts the cabin exhaust air turbine 102 into operation only when the aircraft 1 is flying at a predetermined minimum altitude of, for example, 6000 m, at which the reduced ambient pressure, as compared with normal atmospheric pressure at sea level, is lower than the pressure of the exhaust air discharged from the aircraft cabin.

The control device 105 can control the operation of the motor 104 accordingly. It is possible, for example, for the motor 104 to operate the ambient air compressor 101 only if the cabin exhaust air turbine 102 is not (yet) in operation. In this case, it is also possible for a transmission ratio of the transmission 103 to be changed to compensate for differences in speed between the cabin exhaust air turbine 102 and the motor 104. In the case where the motor 104 is operated in addition to the cabin exhaust air turbine 102, it is also possible for the transmission 103 to be set in such a way that the motor 104 or the cabin exhaust air turbine 102 drives the ambient air compressor 101 by way of support.

The motor 104 can be an electric motor. Alternatively, it is also possible to use a hydraulic motor. The hydraulic motor 104 can be connected to a hydraulic system 40. This hydraulic system 40 can be an existing hydraulic system, e.g., a hydraulic system for the actuation of an undercarriage of an aircraft equipped with the aircraft refrigeration system 10. This has the advantage that a sufficiently powerful hydraulic system can be used, which is not required in most operating phases of the aircraft 1, without having to install an additional hydraulic system for the motor 104.

The motor 104 can also be used by a fan 111. The fan 111 is arranged in a ram air duct 30 and can move/deliver ram air through the ram air duct 30. The fan 111 can be coupled directly to the motor 104, with the result that a speed of the motor 104 determines a speed of the fan 111. As an alternative, an auxiliary train 112 can be coupled to the motor 104 and the fan 111 in order to drive the fan 111. Likewise, as an alternative or in addition, an auxiliary transmission 110 can be provided, which couples the motor 104 to the fan 111 and can set a speed of the fan 111. In this case, the motor 104 can drive the fan 111 on its own or can assist an already existing fan motor 113.

In the variant embodiment illustrated, the ram air duct 30 can be connected to the aircraft environment 15 at a ram air duct opening 31. A cross section of the ram air duct opening 31 can be modified and adapted to the required ram air quantity by a movable flap 35. The ambient air line 130 is connected in a segment 34 of the ram air duct 30 which is situated upstream in the flow direction of the ram air, thus enabling ambient air to flow into the first segment 130a of the ambient air line 130 through the ram air duct opening 31. Another segment 33 of the ram air duct 30 can lead to an outlet opening 32 of the ram air duct 30, which is situated downstream. Within the ram air duct 30, the ram air can be used for various purposes. For example, heat exchangers 22 (in the form of one or more condensers) of the refrigeration unit 20 can be arranged in segment 33 of the ram air duct 30. Furthermore, the refrigeration unit 20 can have a dedicated fan 23, which is arranged in segment 33 of the ram air duct 30. Fan 23 is optional and is required only if fan 111 cannot be dimensioned adequately for cooling the heat exchangers 22 of the refrigeration unit 20.

An auxiliary heater 121 thermally coupled to the cabin exhaust air line 120 upstream of the cabin exhaust air turbine 102 is arranged in a second segment 130b of the ambient air line 130 downstream of the ambient air compressor 101. Here, the terms "downstream" and "upstream" relate to the flow direction of the ambient air through the second segment 130b of the ambient air line 130 and the flow direction of the cabin exhaust air through the cabin exhaust air line 120. During operation, the auxiliary heater 121 transfers heat from the ambient air flowing through the ambient air line 130 downstream of the ambient air compressor 101 to the cabin exhaust air flowing through the cabin exhaust air line 120 upstream of the cabin exhaust air turbine 102. The auxiliary heater 121 can also be bypassed by means of an auxiliary heater bypass line (not shown), wherein the auxiliary heater bypass line branches off from the second segment 130b of the ambient air line 130 downstream of the first ambient air compressor 101 and upstream of the auxiliary heater 121 and opens into the second segment 130b of the ambient air line 130 again downstream of the auxiliary heater 121. By controlling a corresponding valve at the branch into the auxiliary heater bypass line in the ambient air line 130, it is possible to selectively operate the auxiliary heater 121 and consequently to control the temperature of the cabin exhaust air emerging from the cabin exhaust air turbine 102.

In an optional embodiment, there can be additional thermal coupling between the ambient air in the ambient air line 130 and the cabin exhaust air in the cabin exhaust air line 120 in a heat exchanger 126. The heat exchanger 126 is arranged in a segment 122 of the cabin exhaust air line 120 downstream of the cabin exhaust air turbine 102 and is thermally coupled to a third segment 130c of the ambient air line 130. The third segment 130c is arranged downstream of the second segment 130b of the ambient air line 130 and of the auxiliary heater 121 in relation to the flow direction of the ambient air through the ambient air line 130. As a result, pre-cooling of the ambient air flowing through the ambient air line 130 (in this case in segment 130c) can take place.

A cabin exhaust air valve 125 is arranged in a segment 122 of the cabin exhaust air line 120 situated downstream of the cabin exhaust air turbine 102. This cabin exhaust air valve 125 can direct cabin exhaust air flowing through the cabin exhaust air line 120 either via a first segment 123 of the cabin exhaust air line 120 into the ram air duct 30 or via a second segment 124 of the cabin exhaust air line 120 to an outlet 127. The first segment 123 of the cabin exhaust air line 120 opens into the ram air duct 30 upstream of the heat exchanger 22 arranged in the ram air duct 30. The outlet 127 is arranged on an outside of the aircraft 1 in such a way that the cabin exhaust air is discharged in a direction counter to the direction of flight of the aircraft 1. As a result, the formation of turbulences at the ram air duct outlet 32 can be reduced during flight. The cabin exhaust air valve 125 can also simultaneously direct partial flows of the cabin exhaust air into the first segment 123 of the cabin exhaust air line 120 and the second segment 124 of the cabin exhaust air line 120, e.g., when only a small quantity of cabin exhaust air is required to cool the heat exchangers 22 of the refrigeration unit 20.

The cabin exhaust air valve 125 can be equipped with or connected to a temperature sensor (not illustrated separately), which is configured to measure cabin exhaust air flowing through the cabin exhaust air line 120 downstream of the cabin exhaust air turbine 102 in order to control the cabin exhaust air valve 125 on the basis of the measured temperature of the cabin exhaust air. For example, the temperature sensor can be connected to the control device 105 which controls the cabin exhaust air valve 125. As an alternative, it is also possible for the temperature sensor to be integrated as or in an actuator of the cabin exhaust air valve 125, thus enabling the cabin exhaust air valve 125 to be controlled directly in accordance with the temperature of the ambient air.

The third segment 130c of the ambient air line 130 can be thermally coupled to the refrigeration unit 20 via the evaporator 27 arranged in the refrigeration unit 20. Accordingly, the cooling of the ambient air in the ambient air line 130 by heat transfer to the refrigerant circulating in the refrigeration unit 20 takes place during flow through the third segment 130c of the ambient air line 130. The cooled ambient air is then passed into the aircraft cabin A and/or the mixer 25.

Figure 2:
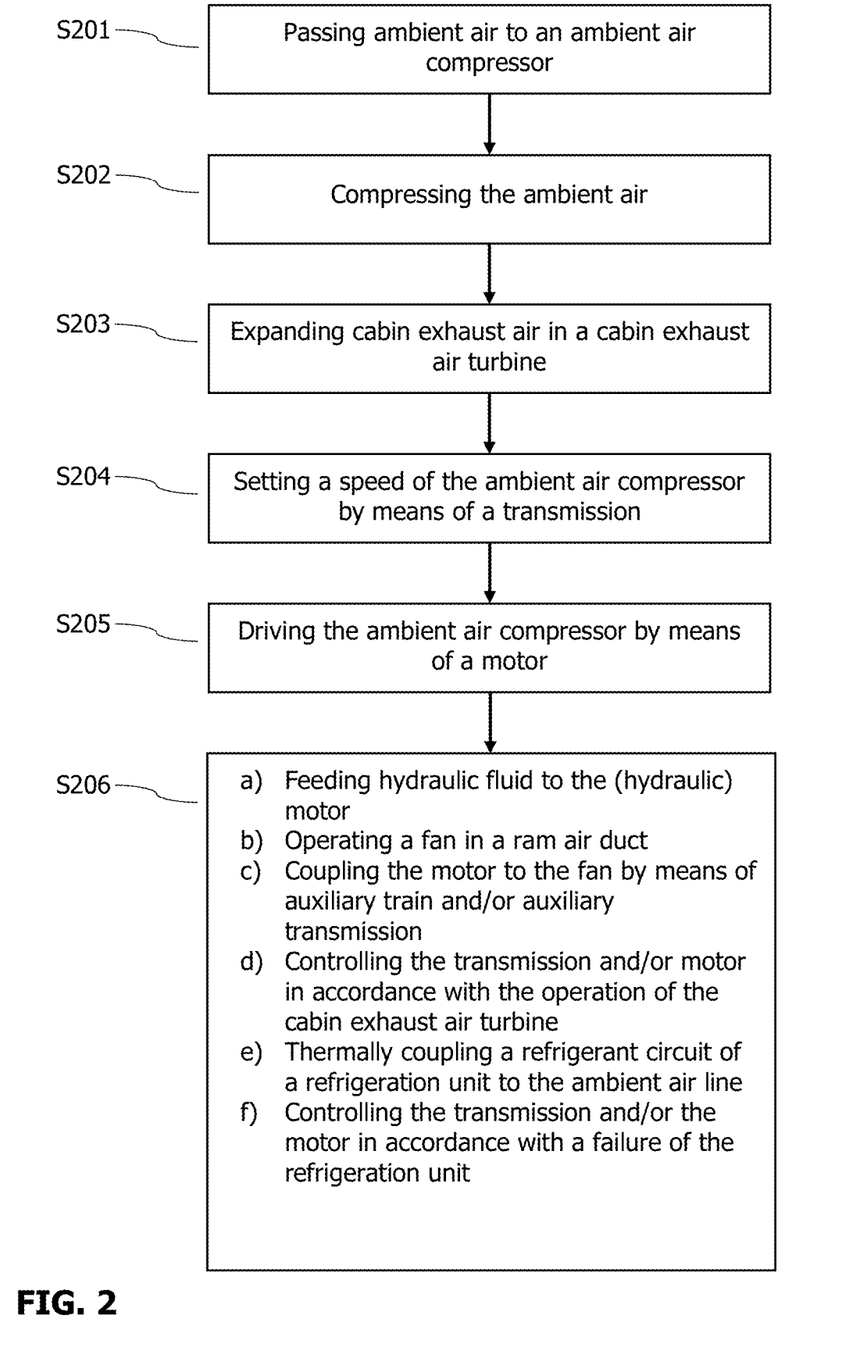
FIG. 2 shows a method for operating an aircraft refrigeration system.

FIG. 2 shows a flow diagram of a method for operating an aircraft refrigeration system 10. Here, in step 5201, ambient air is first of all passed through an ambient air line 130, which is connected to the aircraft cabin A and/or to a mixer 25 of the aircraft air conditioning system 10, in order to feed ambient air to the aircraft cabin A and/or to the mixer 25. The ambient air flowing through the ambient air line 130 is compressed in at least one ambient air compressor 101 arranged in the ambient air line 130 (step S202). Furthermore, in step 5203, cabin exhaust air flowing through a cabin exhaust air line 120 is expanded in a cabin exhaust air turbine 102 connected to the cabin exhaust air line 120, wherein the cabin exhaust air turbine 102 is coupled to the at least one ambient air compressor 101 arranged in the ambient air line 130 and drives the at least one ambient air compressor 101 arranged in the ambient air line 130.

Furthermore, the method can comprise, in step 5204, setting a speed of the ambient air compressor 101 by means of a transmission 103, wherein the transmission 103 is configured to couple the cabin exhaust air turbine 102 to the ambient air compressor 101, and finally, in step 5205, driving the at least one ambient air compressor 101 arranged in the ambient air line 130 by means of a motor 104 coupled to the transmission 103.

The motor 104 can be a hydraulic motor. In the optional step S206a, hydraulic fluid is fed to the motor from a hydraulic system 40 for the actuation of an undercarriage (not shown) of an aircraft 1.

Likewise, as an option, in step S206b, air can be moved in a ram air duct 30 by a fan 111, wherein, in an optional step S206c, the motor 104 is coupled to the fan 111 by an auxiliary train 112, which is configured to drive the fan 111. As an alternative or in addition, the motor 104 is coupled to the fan 111 in step S206c by an auxiliary transmission 110, which is configured to set a speed of the fan 111.

The method can furthermore comprise various control steps S206d carried out by a control device 105. For example, the transmission 103 and/or the motor 104 are/is controlled in accordance with the operation of the cabin exhaust air turbine 102. As an alternative or in addition, the transmission 103 and/or the motor 104 can be controlled in such a way in accordance with the operation of the cabin exhaust air turbine 102 that the ambient air compressor 101 feeds the aircraft cabin A and/or the mixer 25 with a constant volume flow of compressed ambient air.

Another optional step S206e comprises the thermal coupling of the ambient air line 130 to a refrigeration unit 20 as a heat sink in order to transfer heat from the ambient air flowing through the ambient air line 130 to the refrigeration unit 20 before the ambient air is fed into the aircraft cabin A and/or the mixer 25. This step also comprises providing the refrigeration unit 20.

Likewise, as an alternative or in addition, the transmission 103 and/or the motor 104 can be controlled in step S206f in accordance with a failure of the refrigeration unit 20 in such a way that the ambient air compressor 101 feeds the aircraft cabin A and/or the mixer 25 with a minimum volume flow of compressed ambient air required for emergencies and/or that the ambient air compressor 101 maintains a minimum cabin pressure required for emergencies.

Figure 3:
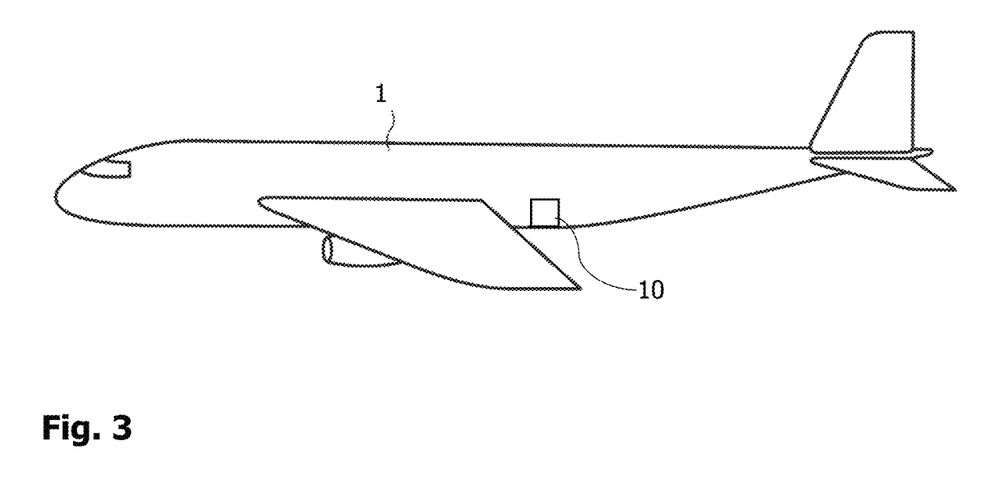
FIG. 3 shows an aircraft having an aircraft refrigeration system.

Finally, FIG. 3 shows an aircraft 1 having an aircraft refrigeration system 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft refrigeration system, comprising:
    an ambient air line connecting an environment of the aircraft to an aircraft cabin, the ambient air line configured to allow a flow of ambient air from the environment of the aircraft to the aircraft cabin,
    at least one ambient air compressor, arranged in the ambient air line, for compressing the ambient air flowing through the ambient air line,
    a cabin exhaust air line connecting the aircraft cabin to the environment of the aircraft, the cabin exhaust air line configured to discharge cabin exhaust air taken from the aircraft cabin into the environment of the aircraft,
    a cabin exhaust air turbine in the cabin exhaust air line downstream of the aircraft cabin, and coupled to the at least one ambient air compressor arranged in the ambient air line and configured to expand cabin exhaust air flowing through the cabin exhaust air line and to drive the at least one ambient air compressor arranged in the ambient air line,
    a heat exchanger arranged between the ambient air line and the cabin exhaust air line, the heat exchanger configured to pre-cool the ambient air flowing through the ambient air line,
    a transmission coupling the cabin exhaust air turbine to the ambient air compressor and configured to set a speed of the ambient air compressor,
    a motor, coupled to the transmission and configured to drive the at least one ambient air compressor arranged in the ambient air line, wherein the motor comprises an electric motor or a hydraulic motor,
    a cabin exhaust air valve arranged downstream of the cabin exhaust air turbine and being configured to direct the cabin exhaust air flowing through the cabin exhaust air line selectively either via a first segment of the cabin exhaust air line into a ram air duct upstream of at least one heat exchanger arranged in the ram air duct or via a second segment of the cabin exhaust air line to an outlet, which is configured to discharge the cabin exhaust air in a direction counter to a direction of flight of an aircraft equipped with the aircraft refrigeration system into the environment of the aircraftl,
    wherein the cabin exhaust air valve is equipped with a temperature sensor configured to measure a temperature of the cabin exhaust air flowing through the cabin exhaust air line downstream of the cabin exhaust air turbine and to control the cabin exhaust air valve based on the measured temperature of the cabin exhaust air.

2. The aircraft refrigeration system according to claim 1, wherein the motor is a hydraulic motor.

3. The aircraft refrigeration system according to claim 2, wherein the hydraulic motor is configured to be connected to a hydraulic system for actuation of an undercarriage of an aircraft equipped with the aircraft refrigeration system.

4. The aircraft refrigeration system according to claim 1, further comprising:
a fan configured to move air in a ram air duct, and at least one of:
an auxiliary train, coupled to the motor and to the fan, and being configured to drive the fan, or
an auxiliary transmission, configured to couple the motor to the fan, and to set a speed of the fan.

5. The aircraft refrigeration system according to claim 1, further comprising:
a thermal coupling device configured to be connected to a refrigeration unit as a heat sink to transfer heat from the ambient air flowing through the ambient air line to the refrigeration unit before the ambient air is conducted into the aircraft cabin.

6. The aircraft refrigeration system according to claim 1, further comprising:
a control device configured to control at least one of the transmission or the motor in accordance with operation of the cabin exhaust air turbine.

7. An aircraft refrigeration system, comprising:
an ambient air line, configured to allow a flow of ambient air and which is connected to an aircraft cabin in order to conduct ambient air to the aircraft cabin,
at least one ambient air compressor, arranged in the ambient air line, for compressing the ambient air flowing through the ambient air line, and
a cabin exhaust air turbine, connected to a cabin exhaust air line and coupled to the at least one ambient air compressor arranged in the ambient air line and configured to expand cabin exhaust air flowing through the cabin exhaust air line and to drive the at least one ambient air compressor arranged in the ambient air line,
a transmission, configured to couple the cabin exhaust air turbine to the ambient air compressor and to set a speed of the ambient air compressor,
a motor, coupled to the transmission and configured to drive the at least one ambient air compressor arranged in the ambient air line,
a cabin exhaust air valve arranged downstream of the cabin exhaust air turbine and being configured to direct the cabin exhaust air flowing through the cabin exhaust air line selectively either via a first segment of the cabin exhaust air line into a ram air duct upstream of at least one heat exchanger arranged in the ram air duct or via a second segment of the cabin exhaust air line to an outlet, which discharges the cabin exhaust air in a direction counter to a direction of flight of an aircraft equipped with the aircraft refrigeration system into an environment of the aircraft, and,
wherein the cabin exhaust air valve is equipped with a temperature sensor configured to measure a temperature of the cabin exhaust air flowing through the cabin exhaust air line downstream of the cabin exhaust air turbine and to control the cabin exhaust air valve based on the measured temperature of the cabin exhaust air.

8. An aircraft refrigeration system, comprising:
an ambient air line connecting an environment of the aircraft to an aircraft cabin, the ambient air line configured to allow a flow of ambient air from the environment of the aircraft to the aircraft cabin,
at least one ambient air compressor, arranged in the ambient air line, for compressing the ambient air flowing through the ambient air line,
a cabin exhaust air line connecting the aircraft cabin to the environment of the aircraft, the cabin exhaust air line configured to discharge cabin exhaust air taken from the aircraft cabin into the environment of the aircraft,
a cabin exhaust air turbine in the cabin exhaust air line downstream of the aircraft cabin, and coupled to the at least one ambient air compressor arranged in the ambient air line and configured to expand cabin exhaust air flowing through the cabin exhaust air line and to drive the at least one ambient air compressor arranged in the ambient air line,
a transmission coupling the cabin exhaust air turbine to the ambient air compressor and configured to set a speed of the ambient air compressor,
a motor, coupled to the transmission and configured to drive the at least one ambient air compressor arranged in the ambient air line, wherein the motor comprises an electric motor or a hydraulic motor, and
a cabin exhaust air valve arranged downstream of the cabin exhaust air turbine and being configured to direct the cabin exhaust air flowing through the cabin exhaust air line selectively either via a first segment of the cabin exhaust air line into a ram air duct upstream of at least one heat exchanger arranged in the ram air duct or via a second segment of the cabin exhaust air line to an outlet, which discharges the cabin exhaust air in a direction counter to a direction of flight of an aircraft equipped with the aircraft refrigeration system into an environment of the aircraft, and,
wherein the cabin exhaust air valve is equipped with a temperature sensor configured to measure a temperature of the cabin exhaust air flowing through the cabin exhaust air line downstream of the cabin exhaust air turbine and to control the cabin exhaust air valve based on the measured temperature of the cabin exhaust air.

\* \* \* \* \*